No. 821,984. PATENTED MAY 29, 1906.
B. T. BURCHARDI & V. J. WAHLSTROM.
CLUTCH AND COUNTER SHAFT MECHANISM.
APPLICATION FILED DEC. 10, 1904.

ATTEST
James W. Leary
Elberon D. Smith

INVENTORS
Bernhard T. Burchardi &
Verner J. Wahlstrom
by Sydney P. Prescott
Atty

UNITED STATES PATENT OFFICE.

BERNHARD T. BURCHARDI AND VERNER J. WAHLSTROM, OF BROOKLYN, NEW YORK.

CLUTCH AND COUNTER-SHAFT MECHANISM.

No. 821,984.      Specification of Letters Patent.      Patented May 29, 1906.

Application filed December 10, 1904. Serial No. 236,339.

*To all whom it may concern:*

Be it known that we, BERNHARD T. BURCHARDI and VERNER J. WAHLSTROM, residing at Brooklyn, in the county of Kings and State of New York, have invented a new and useful Clutch and Counter-Shaft Mechanism, of which the following is a specification.

This invention relates to an improvement in friction-clutch and counter-shaft mechanisms.

Heretofore in clutch mechanisms where the power is applied to the inner periphery of a pulley or drum it has been customary to use a coöperating member in the form of a truncated cone or a system of wedging dogs or toggles. It has been found in practice that these mechanisms sometimes become so tightly locked that it is difficult to disengage them.

It is one of the objects of this invention to provide a clutch mechanism which is simple and compact in construction, inexpensive, and capable of transmitting motion under heavy stresses while being easily thrown out of action.

In counter-shaft mechanisms where a shaft is operated by one of two power-transmitting devices—as for example, pulleys running in opposite directions or at different speeds—a structure more or less complicated and expensive, as well as bulky, has been used.

It is another object of this invention to provide a simple, compact, efficient, and inexpensive device for this purpose.

With these and other objects in view the invention consists in certain constructions and combinations which will be hereinafter fully described and then specifically set forth in the claims hereunto appended.

Figure 1:
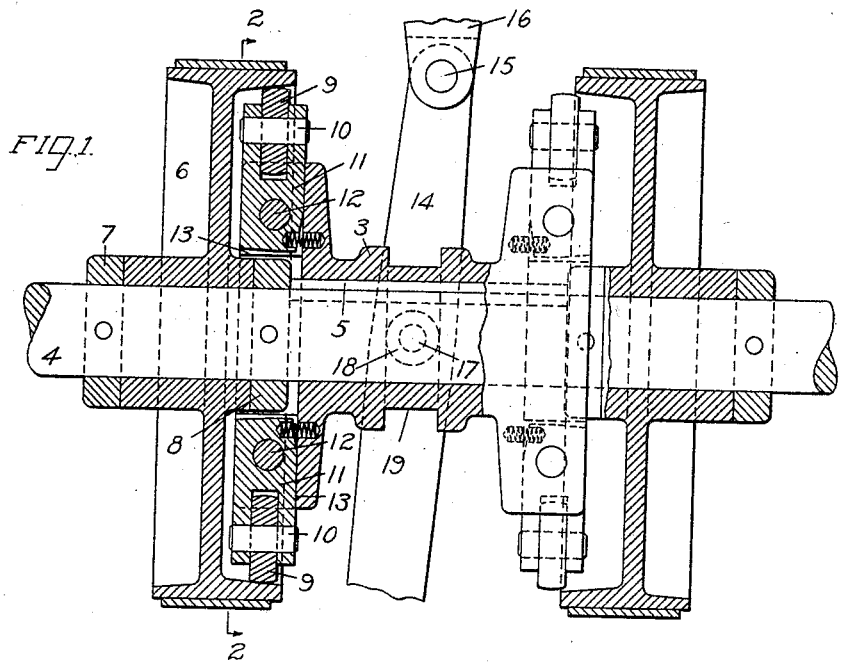
Figure 2:
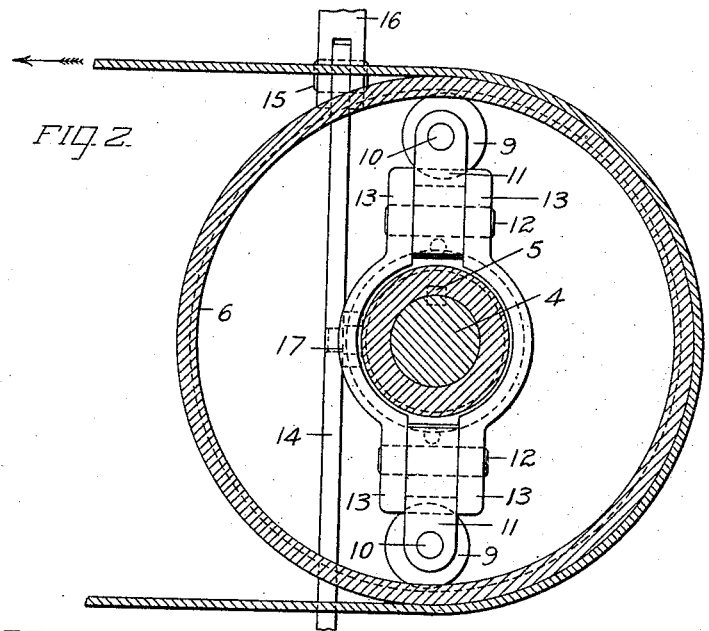

In the accompanying drawings, which form a part of this specification, and in which like characters of reference indicate the same parts, Figure 1 illustrates, partly in section, one embodiment of the invention; and Fig. 2 is a transverse section of the device shown in Fig. 1, the section being taken on the line 2 2.

In the device selected to illustrate the invention a clutch member is used, and this clutch member may vary widely in construction. As shown, however, it consists of a sleeve 3, which is slidably mounted on a shaft 4, mounted in suitable bearings. (Not shown.) The sleeve 3 preferably has a keyway cut therein, and this keyway fits a spline 5, fitted in the shaft 4 in the usual manner. A coöperating clutch member is provided, and this coöperating member may be widely varied in construction. In the preferred construction, and as shown, this coöperating member consists in a pulley 6, loosely mounted on the shaft 4 at one end of the clutch member or sleeve 3 and is held against displacement by two collars 7 8, pinned or otherwise secured on the shaft 4.

In the preferred construction and as shown an eccentric roller or a plurality of eccentric rollers 9 is carried by the clutch member or sleeve 3, the roller or rollers being arranged to engage the coöperating clutch member or pulley 6. The rollers 9 may be mounted in the sleeve 3 in any suitable manner. As shown, however, they are journaled on pins 10, mounted in arms 11, which are pivoted at 12 between lugs 13 13, formed on one end of the sleeve 3, before referred to. The pivoted arms 11 are preferably spring-pressed, as is clearly shown in Fig. 1, the object of which will be hereinafter explained.

It may be here remarked that when the device is to be used as a counter-shaft mechanism for the purpose of reversing the direction of rotation of the driven element or for varying the speed of the driven element the clutch member or sleeve 3 will be provided with two sets of eccentric rollers, one set at each end of said sleeve, and the device will be provided with two coöperating clutch members or pulleys spaced apart, the clutch member or sleeve 3 lying between said coöperating members. As this construction is clearly shown in Fig. 1 and as the mechanism at both ends of the sleeve 3 are alike, a detailed description of the second set is deemed unnecessary and is therefore omitted. Means are provided for giving a movement to one of the members with respect to the other to position the roller, so that it may engage the other member and lock said members. While the desired result may be effected by moving either or both the clutch members, as shown, the clutch member carrying the eccentric rollers is moved. This movement may be produced by any suitable mechanism. As shown, a lever 14, which is fulcrumed at 15 to a suitable hanger or bracket 16, is used, this lever being provided with a stud 17, carrying a roller 18, which engages an annular groove 19, formed in the sleeve 3, before referred to. By inspection of Fig. 1 it will be readily understood that the means just described will produce a movement of the clutch member carrying two sets of eccentric rollers with respect to the coöperating clutch members to position one set of rollers so that it may engage one of said coöperating members.

In the operation of the device, the clutch being open, the lever 14 is moved, carrying the clutch member or sleeve 3 with it, until one set of eccentric rollers engages the rim of one of the coöperating clutch members or pulleys 6, the rim being tapered in the path of the rollers. As soon as the rollers touch the rim of the pulley 6 they are set in rolling motion by the pulley, the pulley being in the construction shown the driver. Owing to the eccentricity of the rollers, this rolling action tends to force the pivoted arms 11 toward each other. This being resisted by the structure, the locking of the clutch members results.

To release the clutch, the lever is moved in the opposite direction, in which case the pivoted arms 11, that have been wedged between their pivots 12 and the rim of the pulley 6, will readily yield against the action of their springs, and as soon as the rollers are disengaged from the rim these springs will return the arms to their normal position.

It will be understood that the action is the same when the sleeve is thrown into engagement with one pulley as with the other, while in an intermediate position it is out of action with both. It follows that if one pulley is run by its belt in the direction indicated by the arrow in Fig. 2 and the other pulley is running in the opposite direction, as is usual in counter-shaft mechanism, the shaft 4 may be held stationary or run in either direction by throwing the lever in one direction or the other.

It is to be understood that the invention is not to be restricted to the construction shown, as the construction may be varied without departing from the invention, that certain parts of the invention may be used independent of other parts, and that such independent use is contemplated.

What is claimed is—

1. The combination with a clutch member, of an eccentric roller carried by said member, a coöperating clutch member, and means for moving one of said members on a line parallel to the axis of the roller to position said roller so that it may engage the other member, substantially as described.

2. The combination with a clutch member, of a plurality of eccentric rollers carried by said member, a coöperating clutch member, and means for moving one of said members on a line parallel to the axis of the rollers to position said rollers so that they may engage the other member, substantially as described.

3. The combination with a clutch member, of a plurality of eccentric rollers carried by said member, a coöperating clutch member, and means for moving said member on a line parallel to the axes of the rollers to position said rollers so that they may engage said coöperating member, substantially as described.

4. The combination with a clutch member, of a plurality of pivoted arms carried by said member, a plurality of eccentric rollers mounted in said arms, a coöperating clutch member, and means for moving said member to position said rollers so that they may engage said coöperating member, substantially as described.

5. The combination with a clutch member, of a spring-pressed pivoted arm carried by said member, an eccentric roller mounted in said arm, a coöperating clutch member, and means for giving one of said members a movement with respect to the other to position said roller so that it may engage the other member, substantially as described.

6. The combination with a clutch member, of two sets of eccentric rollers carried by said member, of two coöperating members, and means for giving one of said members a movement with respect to the other to position one set of rollers so that said rollers may engage another of said members, substantially as described.

7. The combination with a clutch member, of two sets of eccentric rollers carried by said member, of two coöperating members spaced apart, and means for moving said member to position one set of rollers so that said rollers may engage one of said coöperating members, substantially as described.

8. The combination with a shaft, of a clutch member slidably mounted on said shaft, a plurality of eccentric rollers carried by said member, of a coöperating clutch member mounted to rotate on said shaft, and means for sliding said member on said shaft to position said rollers so that they may engage said coöperating member, substantially as described.

9. The combination with a shaft, of a clutch member slidably mounted on said shaft, two sets of eccentric rollers carried by said member, two coöperating clutch members spaced apart and mounted to rotate on said shaft, and means for sliding said member on said shaft to position one set of rollers so that said rollers may engage one of said coöperating members, substantially as described.

In testimony whereof we have signed our names to this specification in the presence of two subscribing witnesses.

BERNHARD T. BURCHARDI.
VERNER J. WAHLSTROM.

Witnesses:
J. D. H. BERGEN,
DE HART BERGEN.